US012158752B2

United States Patent
Fallah et al.

(10) Patent No.: US 12,158,752 B2
(45) Date of Patent: Dec. 3, 2024

(54) SENSOR FAULT PREDICTION METHOD AND APPARATUS

(71) Applicant: UNIVERSITY OF SURREY, Surrey (GB)

(72) Inventors: Mohammad Saber Fallah, Surrey (GB); Liam Thomas Biddle, Surrey (GB)

(73) Assignee: UNIVERSITY OF SURREY, Surrey (GB)

( * ) Notice: Subject to any disclaimer, the term of this patent is extended or adjusted under 35 U.S.C. 154(b) by 0 days.

(21) Appl. No.: 17/788,407

(22) PCT Filed: Dec. 22, 2020

(86) PCT No.: PCT/GB2020/053345
§ 371 (c)(1),
(2) Date: Jun. 23, 2022

(87) PCT Pub. No.: WO2021/130486
PCT Pub. Date: Jul. 1, 2021

(65) Prior Publication Data
US 2023/0039073 A1    Feb. 9, 2023

(30) Foreign Application Priority Data
Dec. 23, 2019   (GB) ..................................... 1919198

(51) Int. Cl.
G05B 23/02    (2006.01)
(52) U.S. Cl.
CPC ....... *G05B 23/0283* (2013.01); *G05B 23/024* (2013.01); *G05B 23/0254* (2013.01)

(58) Field of Classification Search
CPC .............. G05B 23/0283; G05B 23/024; G05B 23/0254
See application file for complete search history.

(56) References Cited

U.S. PATENT DOCUMENTS

| 2009/0002148 | A1* | 1/2009 | Horvitz | ................ G08G 1/0112 340/514 |
| 2018/0231394 | A1* | 8/2018 | Goh | .......................... G01D 3/08 |
| 2018/0246236 | A1* | 8/2018 | Murata | .............. G06Q 30/0283 |

(Continued)

FOREIGN PATENT DOCUMENTS

| CN | 102109363 A | 6/2011 |
| EP | 3459810 A1 | 3/2019 |
| WO | 2016040082 A1 | 3/2016 |

OTHER PUBLICATIONS

Olivan, Kernel-based support vector machines for automated health status assessment in monitoring sensor data (Year: 2018).*

(Continued)

*Primary Examiner* — Mohammad K Islam
(74) *Attorney, Agent, or Firm* — Wegman Hessler Valore (57) ABSTRACT

A method and apparatus are provided for sensor fault prediction. A time-sequence of output values is received from a sensor. A plurality of features are extracted from the received values. A model is applied to the features to obtain a health score for the sensor. The trend of the health score over time is calculated to detect degrading performance of the sensor, and a time at which the sensor will become faulty is predicted.

11 Claims, 6 Drawing Sheets

(56) References Cited

U.S. PATENT DOCUMENTS

2018/0356809 A1 12/2018 Trainor et al.
2018/0373235 A1 12/2018 West et al.

OTHER PUBLICATIONS

Jan et al. (Sensor Faults Detection and Classification using SVM with Diverse Features, IEEE 2017) (Year: 2017).*
Guo et al. (UAV Sensor Fault Detection Using a Classifier without Negative Samples: A Local Density Regulated Optimization Algorithm, 2018) (Year: 2018).*
Hong et al. (Fault Diagnosis of Aeroengine Sensor Based on Support Vector Machine, 2011) (Year: 2011).*
Jeong et al. (model-based sensor fault diagnosis of vehicle suspensions with a support vector machine, 2019) (Year: 2019).*
Jahnke , Machine Learning Approaches for Failure Type Detection and Predictive Maintenance (Year: 2015).*
Smola et al. ,A tutorial on support vector regression (Year: 2004).*
Jan et al. , Sensor Fault Classification Based on Support Vector Machine and Statistical Time-Domain Features, IEEE, 2017 (Year: 2017).*
Zhou et al. ,A Fault Detection and Health Monitoring Scheme for Ship Propulsion Systems Using SVM Technique (Year: 2018).*
Deng et al. ,Sensor Multifault Diagnosis With Improved Support Vector Machines, IEEE (Year: 2017).*
Combined Search and Examination Report for Application No. GB1919198.0 dated Jun. 8, 2020, 3 pages long.
Wang, et al., "Failure Detection and Validation of Multifunctional Self-validating Sensor Using WRVM Predictor", Proceedings of the 2012 IEEE International Conference on Industrial Technology (ICIIT), Mar. 2012, https://ieeexlore.ieee.org/document/6209961, 10 pages long.
International Search Report and Written Opinion for International Patent Application No. PCT/GB2020/053345 dated Mar. 12, 2021, 8 pages long.
Examination Report for European Patent Application No. 20838265.5 dated Apr. 25, 2024, 7 pages long.

* cited by examiner

SENSOR FAULT PREDICTION METHOD AND APPARATUS

CROSS REFERENCE TO RELATED APPLICATIONS

This application is a national phase of International Patent Application No. PCT/GB2020/053345 filed Dec. 22, 2020, which claims the priority filing benefit of Great Britain Patent Application No. 1919198.0 filed Dec. 23, 2019, which are incorporated herein by reference in their entireties.

The present invention relates to a method and apparatus for predicting a future time at which the performance of a sensor would be classed as faulty.

With the advent of autonomous vehicles, the number of sensors within cars has been significantly increased. As such applications become more reliant on a diverse set of sensors to operate, the fault tolerance and health awareness of these systems becomes more important. Current vehicles on the road rely on periodic maintenance and repair regimes to keep the vehicle in a safe and reliable operating range. However, periodic maintenance and repair regimes are not ideal for autonomous vehicles as there is no mechanism to monitor the health of the various parts in-between service intervals. It is noted that an unpredicted fault in sensors can spread through each stage of autonomous driving functions, generating significant errors in the output of these functions (e.g. decision making, stability control systems, etc.), which in turn reduces vehicle safety and may have severe consequences.

The main approaches to developing fault tolerance can be grouped into hardware redundancy, model-based methods, and data-driven methods. Hardware redundancy has been the traditional approach that relies on comparing the outputs of two identical sensors. When they disagree by a certain margin, a fault is present. This evidently can be a costly approach, which is often not economical in mass-production automotive applications. Model-based methods however typically operate by calculating residuals between measured parameters and a model of the system, as opposed to a physical second sensor. Model based fault-detection has seen attention in the automotive sector for systems such as navigation, electrical power systems, and yaw moment control, where safety considerations are particularly critical. As more sensors and systems are used however, more complex models must be developed and implemented, which is a major weakness of model-based methods. Typically, the model-based techniques suffer from lack of robustness against un-modelled dynamics, model uncertainties and sensor noise. Additionally, existing techniques are limited to specific known faults for identification purposes, which for fault identification can be a weakness if not all fault types are known.

Data-driven methods instead use large amounts of data to model the vehicle and its fault conditions by creating models to capture the behaviour of complex systems that would be difficult to describe with a model-based method. The need for large amounts of data for data driven methods is a fundamental concern. However, recent advancements in connected vehicles, distributed computing platforms and a possibility to store and analyse data arising from different sensors opens up avenues for development of intelligent fault detection, isolation and identification (FDII) systems for automotive applications using data-driven methods. The effectiveness of data-driven learning techniques for fault detection and maintenance has already been demonstrated in the aircraft industry. These previous bodies of work indicate that extending the fault detection and fault tolerance of autonomous vehicles to the realm of data driven techniques can potentially provide great benefits in terms of vehicle safety.

The main approaches of data-driven methods for this purpose include Artificial Neural Networks (ANN), k-Nearest Neighbours (k-NN), and Support Vector Machines (SVM). ANNs map input nodes to output nodes using hidden layers, with the mapping being used to determine whether new data is faulty while k-NNs classify the data using the classification of k neighbours to determine whether new data is faulty or not. Typically, both ANNs and k-NNs suffer from poor generalisation performance. SVMs are a statistical learning method which can identify a separating hyperplane between faulty and normal data, and can use this plane to determine whether new data is faulty or not, providing greater generalisation capability compared to ANNs and k-NNs.

Current data-driven FDII architectures can be categorised as single fault detection for a single sensor, single fault detection of multi-sensor systems, and multi fault detection and identification of a single sensor. Despite significant recent interest in data driven approaches for fault detection and identification applications, there are still gaps remaining in the current research with regards to multi-faults identification and detection of multi-sensor systems as well as condition-based predictive fault detection. As real systems comprise of multiple sensors, the possibility of two or more sensors being in a fault condition is probable, so overcoming this gap is important. On the other hand, the lack of condition-based predictive fault detection is also an ongoing challenge. Data-driven methods have been applied previously to predict faults based on usage data such as running hours and lifetime, but usage-based data are usually correlated between time-based data and the fault types, which is not strictly true for sensor faults. By using condition-based data to detect faults, all types of faults that manifest themselves as alterations to the measured signal can be identified.

The present invention has been devised in view of the above problems.

Accordingly, one aspect of the present invention provides a method of sensor fault prediction, comprising:
receiving a time-sequence of output values from a sensor;
extracting a plurality of features from the received values;
applying a model to the features to obtain a health score for the sensor;
calculating the trend of the health score over time to detect degrading performance of the sensor, and
predicting a time at which the sensor will become faulty.

Another aspect of the invention provides a computer program comprising computer-executable code that when executed on a computer system causes the computer system to perform a method according to the above aspect of the invention.

A further aspect of the invention provides a computer program product, directly loadable into the internal memory of a digital computer, comprising software code portions for performing a method according to the above method of the invention when said product is run on a computer.

Another aspect of the invention provides an apparatus for predicting a sensor fault, the apparatus being arranged to:
receive a time-sequence of output values from at least one sensor;
extract a plurality of features from the received values;
apply a model to the features to obtain a health score for the sensor;

calculate the trend of the health score over time to detect degrading performance of the sensor, and predict a time at which the sensor will become faulty.

A term such as 'faulty', as used herein, does not necessarily mean failure of the sensor, but can mean that the performance of the sensor is such that it no longer satisfies a predetermined quality of performance, as defined by some criterion, threshold or metric, such that the performance of the sensor is classed as a fault.

Embodiments of the invention can be used to provide an estimate of the time at which degrading performance of a sensor would be classed as a fault.

Further optional features of embodiments of the invention are defined in the dependent claims.

Embodiments of the invention will now be described, by way of example only, with reference to the accompanying drawings, in which.

ARCHITECTURE AND ALGORITHMS

The following specific embodiments of the invention can be broadly described as Integrated Vehicle Health Monitoring (IVHM). The benefits of IVHM are improved vehicle safety, more accurate health awareness and reductions in through-life costs. The proposed FDII system comprises of both current vehicle state awareness (fault detection and identification) and prediction to determine future vehicle health. An adequate understanding of the vehicles current health state allows for intelligent vehicles to reconfigure the available healthy systems to compensate for failures, or for maintenance to be directed quickly to the faulty components. Predictive fault detection allows for the condition of the vehicle systems to be predicted at a future point in time. The proposed predictive FDII system provides the opportunity to control systems to reconfigure themselves in advance of a sensor failure or fault.

Figure 1:
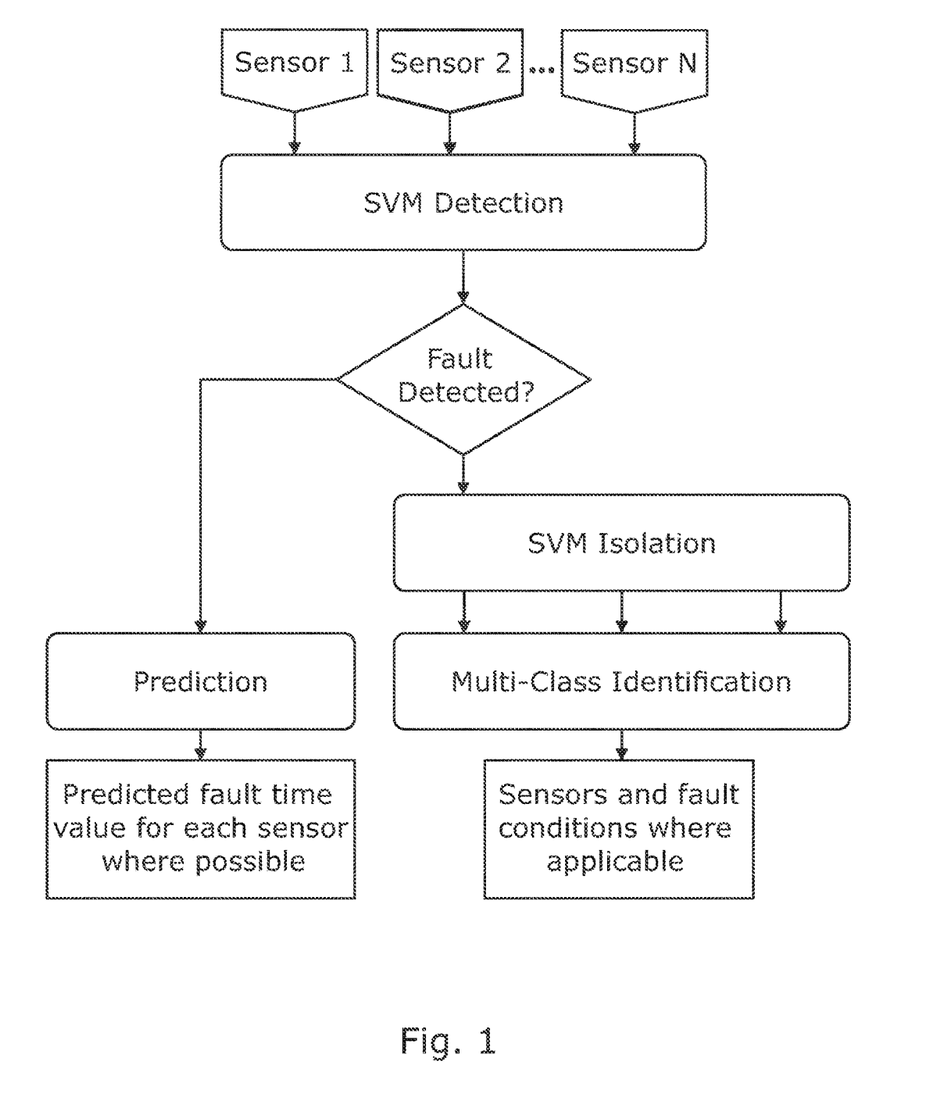
FIG. 1 is a schematic illustration of a system architecture according to an embodiment of the invention.

The overall architecture of the proposed FDII system is shown in FIG. 1. It is comprised of Detection, Isolation, Identification and Prediction modules.

The first step, detection, takes a number of independent sensor signals and applies a feature extraction function generating features for each signal, and combining them. These features are used in a single class SVM model to identify whether a fault is present in the sample. If a fault is detected, the samples are processed further.

In order to establish which of the sensors is faulty within a combined signal sample, the signal is split into the segments pertaining to each sensor which are then individually tested against its respective single class SVM model. Each of the SVM models is trained on only the sensor it pertains to as each sensor has different characteristic features as previously discussed. This architecture is therefore resilient to multi-sensor fault. If no fault is detected in any of the sensors, the detection is assumed to be a false positive. Another advantage to this approach is the performance benefits for real-time operation. Because these isolation SVM models are only run when a fault is detected, the overall architecture can benefit from improved speed.

The SVM model is re-used in the prediction module to determine for non-faulty samples if the signal for that sensor is degrading. Samples within the prediction module are tested against the SVM model and a health score computed. Statistical information of this health score is then used to make predictions as to when the sample may become faulty.

Finally, each sensor found to have a fault is then tested against a multi-class SVM model to identify which type of fault is occurring. No healthy data is passed to the identification module which means that only a single identification model is needed.

The primary outputs of the system are the sensors which are faulty for that time-sample and the fault condition identified for each faulty sensor. The secondary output is; for those sensors not in fault condition but have degraded performance, the time in which the fault is predicted to occur.

Development of Models

The architecture proposed has been developed further in order to identify the theoretical considerations of SVM techniques, faults and fault prediction. The models and decisions made to implement the architecture above are explored here.

1. SVM Models

This embodiment of the invention uses SVM techniques, however another common data-driven method, ANNs, can be used in different embodiments. Artificial Neural Networks are an approach which map input source nodes through hidden layers of computation nodes to output nodes. This method transforms input data between layers using an activation function. The training builds connections between nodes while minimising an error function comparing computed outputs to the actual outputs. Typically, the ANN method suffers from poor generalisation performance compared to SVMs due to the optimisation function used to train them. As generalisation performance is desirable for the varied scenarios that automotive sensors are subjected to, SVMs are therefore preferable.

SVM models identify a set of support vectors within a dataset which define a separating hyperplane. New data points are then classified based on which side of this hyperplane they lie. This method relies on statistical learning and can offer higher accuracies and generalisation capability due to the distinctive features that define the hyperplane.

For datasets which cannot be linearly separated by a hyperplane, a kernel function can be applied to transform the feature-space into higher dimensions which are linearly separable. There are several kernel functions that can be used, the most common of which are Linear, Polynomial and Radial-Basis Function (RBF). Generally, RBF was found to give more satisfactory performance for classification of multiple sensor faults and as such has been used for this preferred embodiment.

One of the most significant efforts within this method is in identifying features of a sensor signal that are unique to a fault condition. Much work has been completed on different time-domain and frequency-domain features, illustrating the impact on classification accuracy that selection can have. It has been found that time-domain features are sufficiently detailed to give high classification accuracies for fault detection, and as such frequency-domain features are unnecessary. Using more features yields diminishing returns on classification accuracy, however increases the computational time for a model to be trained and tested. As such, a compromise needs to be reached between the required classification accuracy and the computational power available.

Recently, modifications to the traditional SVM method have been proposed as well as hybrid data fusion methods which can offer higher classification accuracies in certain cases. Therefore, for this embodiment, an approach called k-fold cross-validation (CV) has been used with the SVM models to reduce the generalisation error, as overfitting is a concern with this method. The dataset is divided into k sets and the model is trained k times, each time leaving out one of the sets and testing with the set which is left out. Statistical features of this process are then used to calculate the generalisation error.

2. Faults

There are many different types of faults that can affect sensors, and therefore not all types have been modelled exhaustively for this embodiment of the invention. Five distinct definitions have been modelled for this work, which represent likely types of faults that can occur for the sensors in an automotive controller, but other sets of fault types could be used in other embodiments of the invention. Fault types can be intermittent, which are discussed herein as it is expected to be a more difficult case to detect for SVM models.

Figure 2:
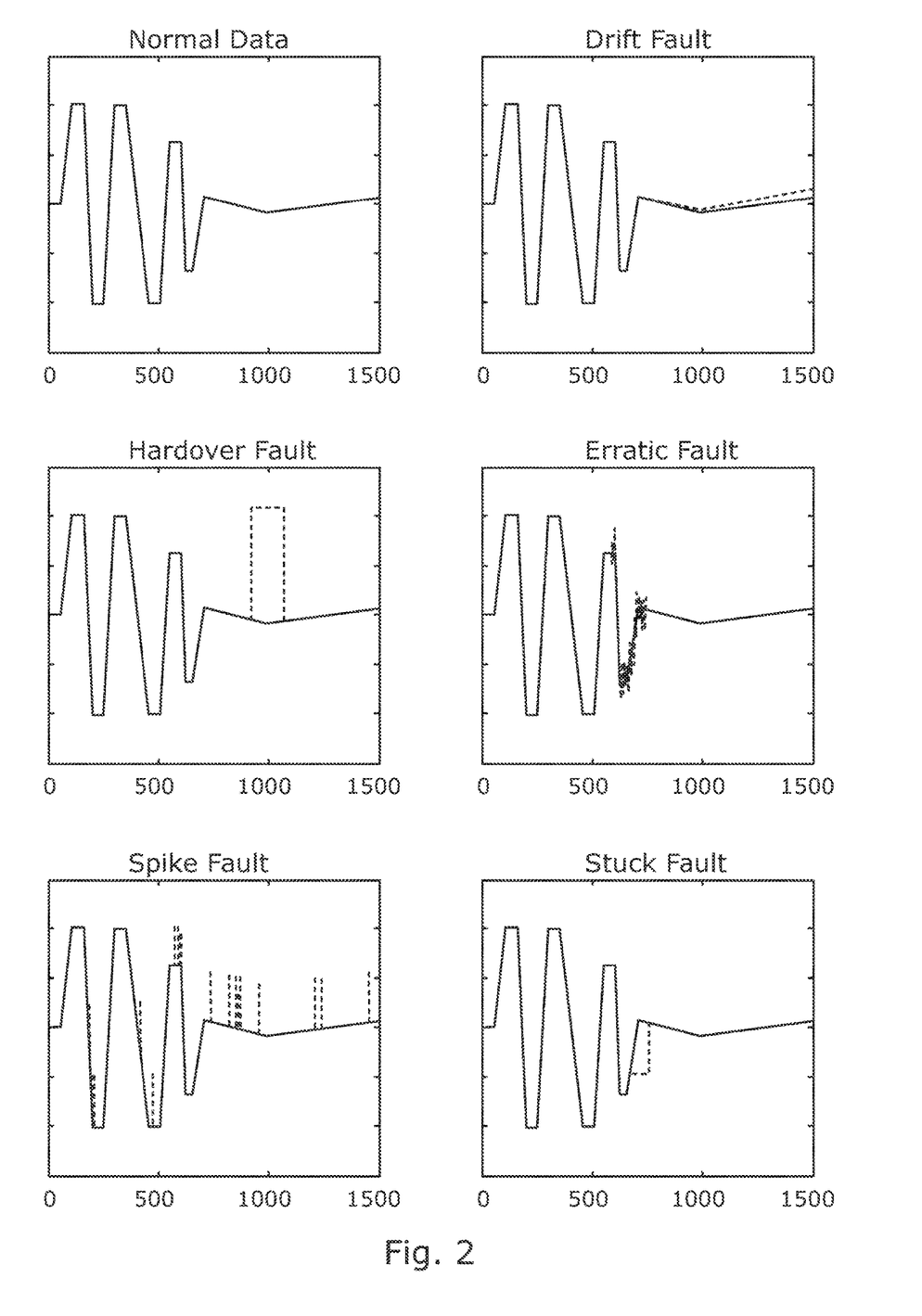
FIG. 2 shows graphs of different fault types injected into normal signal samples of a steering wheel angle sensor.

These types of sensor faults are defined as: drift, hard-over, erratic, spike and stuck faults, shown in FIG. 2. The following definitions are used for these faults:

Drift faults—The sensor value deviates linearly over time from the true value.

Hard-over faults—The sensor value increases to the saturation point for a short period of time.

Erratic faults—The sensor value varies about the true value. The magnitude of this variance can increase over time.

Spike faults—The sensor value is significantly above the true value for a single point. The density of spike faults within the signal can increase over time.

Stuck faults—The sensor value remains at a fixed value for a short period of time.

3. Feature Selection and Extraction

Feature selection is important in order to capture sufficient defining features about a signal, and specifically the characteristics of a fault present in a signal sample. In this embodiment, this step is performed using a feature extraction algorithm applied to each signal sample.

As has been previously explored, increasing the number of time-domain features which describe the signal yields diminishing increases of classification accuracy. Therefore, a feature space utilising time-domain features is used to train and test the SVM algorithms to give sufficient detection accuracy while simplifying the system. Frequency-domain features were not considered as the time-domain features selected have been sufficient to differentiate between faulty and normal signals.

TABLE 1

Time-domain feature definitions used for N data points in a sample x $$f_{RMS} = \sqrt{\frac{1}{N}\sum_{i=1}^{N} x_i^2} \qquad f_{SRA} = \left(\frac{1}{N}\sum_{i=1}^{N} \sqrt{|x_i|}\right)^2$$

TABLE 1-continued

Time-domain feature definitions used for N data points in a sample x $$f_{KV} = \frac{1}{N}\sum_{i=1}^{N}\left(\frac{x_i - \mu_i}{\sigma}\right)^4 \qquad f_{SV} = \sum_{i=1}^{N}\left(\frac{x_i - \mu_i}{\sigma}\right)^3$$

$$f_{PPV} = \max(x) - \min(x) \qquad f_{CF} = \frac{\max(|x|)}{f_{RMS}}$$

$$f_{IF} = \frac{\max(|x_i|)}{\frac{1}{N}\sum_{i=1}^{N}|x_i|} \qquad f_{MF} = \frac{\max(|x|)}{f_{SRA}}$$

$$f_{SF} = \frac{\max(|x|)}{\sqrt{\frac{1}{N}\sum_{i=1}^{N}x_i^2}} \qquad f_{SF} = \frac{\frac{1}{N}\sum_{i=1}^{N}\left(\frac{x_i - \mu_i}{\sigma}\right)^4}{\left(\frac{1}{N}\sum_{i=1}^{N}x_i^2\right)^2}$$

Table 1 shows the feature definitions used for various fault types. These features are Root Mean Square (RMS), Square Root of Amplitude (SRA), Kurtosis Value (KV), Skewness Value (SV), Peak-to-Peak Value (PPV), Crest Factor (CF), Impulse Factor (IF), Marginal Factor (MF), Shape Factor (SF) and Kurtosis Factor (KF).

The pseudocode for this implementation is shown in Algorithm 1. The output of this function is a matrix of features, where each row is a single k-datapoint sample, with each column being the value of the feature defined in Table 1.

Algorithm 1. Feature Extraction Pseudocode

```
function Feature Extraction(data)
    Sampling Rate = N
    for i = 1 : end(data)
    X_i = data(i : I + N)
    Feature 1 = f_1(X_i)
    ...
    Feature k = f_k(X_i)
    if X_i = faulty
        Label = 1
        Fault Type = 1,2...,N
    else
        Label = 0
        Fault Type = 0
    End
    Output(Features, Label, Fault Type)
```

4. Fault Detection

Fault detection is one of the primary objectives of this FDII system. As any number of sensors can be in a fault condition, the sensor signals are combined and an SVM model uses the features extracted from all sensor signals to determine if any of the sensors are in a fault condition. This is beneficial as it reduces the complexity of the architecture into a single SVM model for detection, rather than independent detection models for each sensor. As the number of sensors used increases, the benefits of this approach are more apparent.

The main objective of fault detection is to determine whether the overall functional system is faulty or safe to use. The criticality of the fault cannot be investigated at this step as the detection model can only report that there is a fault present. In order to reconfigure the system or direct maintenance efforts, the signal is split into the respective sensor signals and each signal then passed to the fault isolation module to determine which specific sensors are in fault condition.

5. Fault Isolation

Fault isolation is necessary to identify which sensors are reporting faults. It is possible to perform independent fault detection on each sensor instead of fault detection on the entire combined signal feed, however this adds computational load to the overall FDII system as described above. Independent fault detection is also evidently less feasible when the number of sensors is increased. For this embodiment, the isolation module tests each sensor only for those signal samples in which a fault is detected, which reduces computational load.

Each sensor type has an SVM model, as each sensor has different characteristic 'normal' signal types even after normalisation. These models are tested against new samples that are determined by the detection model to be faulty. This approach allows for any number of sensors to be declared faulty for a particular sample which ensures the architecture is multi-sensor, multi-fault tolerant. Any samples which are determined to be faulty are then passed to the fault identification module to determine which type of fault is occurring for that particular sensor.

6. Fault Identification

Once a fault has been detected and isolated, it then needs to be identified as a particular fault type. This is important as different fault types have different impacts on vehicle reconfigurability. For example, a drift fault may not be serious enough to cause a significant reduction in vehicle safety, whereas a hard-over fault would be.

To determine which type of fault is present, the signal for each sensor is used in a multi-class SVM model, with one class for each fault type. There is an additional implied class (normal data) however it is never trained or tested for. It is assumed that all data that reaches the identification stage should be faulty data. This is opposed to other methods, which use the multiclass model to both detect and identify a fault in a single sensor. This preferred embodiment can give slightly higher identification accuracies because faulty data cannot be mis-classified as normal data.

The benefit of performing fault identification on each of the three sensors rather than on the combined signal is that it reduces the number of classes needed to represent every possible combination of sensor fault. As multi-sensor failure tolerance is the preferred aim, this approach is more appropriate.

As the normal signal is not tested for, only a single multi-class identification model is trained with the data from all three sensors, and then each sensor is tested individually using the same model for each sensor.

7. Fault Prediction

One area of interest is the use of SVM models to predict faults. Within this embodiment of the invention, conventional methods have been modified and extended to provide a time position for which the fault is predicted to occur. This brings many benefits to automotive applications, especially in autonomous vehicles as they lack a human driver who can actively detect faults in the vehicle systems. If degrading performance is detected and a fault predicted to occur before the end of a driving scenario, a higher-level vehicle control system could reconfigure itself or adjust its mission profile to continue meeting its safety requirements.

Within the detection SVM model, the separating hyperplane or 'decision-boundary' can be tested with new samples that identify a fault which degrades sensor performance over time. The distance between this decision boundary and the new sample can be used to identify how 'healthy' and how 'faulty' the signal is. The smaller the value, the closer to the decision boundary the sample lies. Negative values represent members of the opposing class.

In the implementation of this embodiment of the invention, the distance X to the 'decision boundary' is normalised using a logistic function (such as $$\frac{1}{1+e^{-X}})$$

to obtain a 'health score'. This normalization is in order to clip the significant variations of healthy/unhealthy samples and to focus on the transition between the two. The values of the health score are bounded between 0 and 1, with the threshold of normality lying at 0.5; greater than 0.5 representing healthy and less than 0.5 representing faulty. Applying simple trend analysis was not always found to be sufficient to allow for predictions to be made. As such, a trailing moving average is also applied to the health score values to smooth the transition and help consistent predictions be made. The number of points in the moving average is at least 2, for example 5. The pseudocode for this is shown in Algorithm 2.

---

Algorithm 2. Health Score and Prediction Pseudocode function Health Score(Detection SVM Model, Signal)
Features = Feature Extraction(Signal)
[Label, X] = Detection SVM Model(Features)

Health Score = $\frac{1}{1+e^{X}}$

Average Score = Moving Average(Health Score)
if Average Score(i) < Threshold
    m = i
    n = m + 2
    Trend = Linear Line(Average Score(m : n))
end
while (gradient(Trend) < Set Point && Trials < N)
    N = N + 1
    m = m + 1
    N = m + 2
    Trend = Linear Lined Average Score(m : n))
End
Output(Health Score, Trend)

---

The gradient of the moving average of the health scores can be used to predict whether the trend is heading toward a faulty condition (at the boundary value 0.5), and to predict the likely time until the transition to faulty occurs. In a preferred embodiment of the invention, the prediction of an approaching fault is only found to be appropriate if the average normalised health score is below a threshold value, such as 0.7.

For fault prediction, three types of faults are applicable: Drift, Erratic and Spike. This embodiment of the invention exemplifies this prediction method for the erratic fault because it is thought to be the more serious and most difficult to detect given its highly variable nature.

Performance

In order to test the proposed architecture and algorithms, a conventional controller for autonomous vehicles has been used. The controller consists of three input signals: driving torque, brake pressure and steering wheel angle. Two output signals considered to analyses the effect of introduced faults on vehicle control performance are linear velocity (Vx) and yaw moment (Mz). All simulations have been run using a co-simulation environment MATLAB/IPG Carmaker.

The dataset generated to train and test the proposed FDII system comprised of 3 million data-points, with each point containing the signal amplitude for each sensor in a 10 ms interval. This represents 500 minutes of simulated data sampled at 100 Hz. The ratio between training and testing data has been set at 80% training to 20% testing. This has been set high deliberately to ensure sufficient variety of training scenarios are captured. This will help reduce the generalisation error discussed above.

Testing began with a small trial dataset of 300,000 data-points in order to tune and test without significant processing time. The accuracies calculated are the number of correct classifications over the total number of classifications.

1. Data Collection

Three simulated driving scenarios are used to build the dataset using IPG Carmaker software: one typical of urban driving, one of highway driving and one of parking. The driving scenarios have been duplicated to represent multiple runs of each scenario to fill the specified number of datapoints. All scenarios are then combined to fill the datasets. The selection of driving scenarios is intended to capture the variety of sensor outputs that may be seen in normal conditions and to explore the effect that these scenarios have on SVM accuracies. This is important in order to ensure the model does not predict normal driving data as faulty.

The simulations use data that have faults artificially generated and injected into the three sensor signals, namely driving torque, brake pressure, and steering wheel angle. The injection of each fault incorporates pseudo-randomness to simulate the variability of each fault condition. Intermittency of fault conditions has been included for hard-over, erratic, spike and stuck to simulate real-world fault conditions. Half of the scenarios had a fault injected into them to provide sufficient training material of the scenarios.

For the driving scenarios which have had a fault injected, the fault is introduced after the 25th percentile of one or more of the three sensor signals. The type and location of fault are introduced using a uniform distribution to get an equal distribution of faults. Normal distributions have been used to simulate the amplitude of faults where applicable. An error of 20% of Full-Scale Output (FSO) has been defined as faulty for the erratic and drift faults.

TABLE 2

Fault Parameters

| Fault | Amplitude | Gradient | Max Length (datapoinss) |
|---|---|---|---|
| Drift | MA | $\pm \frac{1}{\text{Scenario Length}}$ | N/A |
| Hard-over | 1.1 × signal FSO | N/A | 0.5 × scenario length |
| Erratic | ±0.2 × signal FSO | N A | 0.4 × scenario length |
| Spike | +0.5 × signal FSO | N/A | NA |
| Struck | N/A | N/A | 100 |

The fault parameters shown in Table 2 have been selected to give a suitable representation of real-world faults for the simulated data. Uniform distributions are used to incorporate randomness into drift fault gradient, hard-over fault length, erratic fault length and stuck fault length. The erratic fault amplitude uses a normal distribution with a standard deviation of 0.2.

2. Detection Performance

For detection, a 30-feature single class SVM model has been trained, with 10 features captured per sensor. As can be seen from FIG. 3, the prediction closely matches the actual faults that were generated in the simulated dataset, representing the accuracy of the detection SVM model. The accuracies of the model for detection of different injected faults are tabulated in Table 3.

Figure 3:
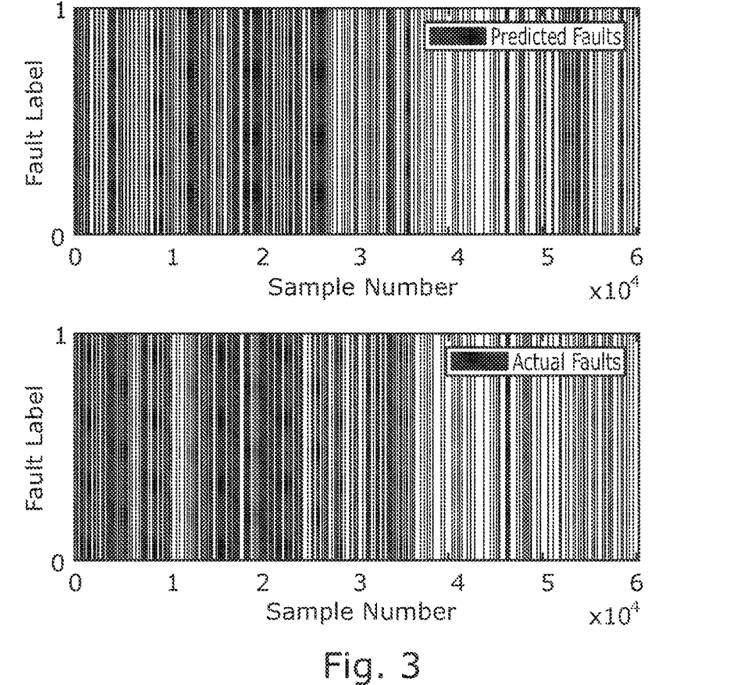
FIG. 3 shows fault detection classification results from a 30-feature SVM model alongside the actual faults represented by the sample data.

As the table shows, the model detects each fault with a minimum accuracy of 88.42% for drift faults and a maximum accuracy of 99.97% for hard-over faults. However, these accuracies are likely higher than would be observed using real sensor data as the data in the normal class does not contain any noise.

TABLE 3

Detection accuracies for the trial and full datasets

| | Overall Accuracy | Drift | Hard-over | Erratic | Spike | Stuck |
|---|---|---|---|---|---|---|
| Trial | 94.54 | 81.73 | 99 49 | 92.76 | 99.75 | 96.80 |
| Simu-lation | 94.94 | 88.42 | 99.97 | 89.66 | 99.96 | 96.54 |

The accuracy for the spike fault class was found to be higher than that reported previously. This has been investigated and the potential reason would be the smaller sample size of 10 datapoints compared to the other approaches using 1000 datapoints per sample. This means that the spike faults can represent a larger proportion of the sample for a given spike fault density, and therefore have more distinctive features. No discernible accuracy reductions are observed as a result of the smaller sample size in other fault classes.

Drift faults typically are harder to detect at their initiation, as they can be typical of normal sensor behaviour. This is shown here with drift faults being the hardest fault types to detect, however the accuracy is still appreciably high.

Stuck faults show a lower accuracy as one characteristic feature of stuck faults is the absence of noise presented after fault initiation. Due to the lack of noise in the simulations, stuck faults are not as easily distinguished from normal data. This is a weakness of simulating sensor data. It does however highlight that for sensors which lack significant characteristic noise, stuck faults may be difficult to detect.

Hard-over faults are noticeably easy to detect as they have significantly abnormal features. With a signal gradient approaching infinity, no normal driving scenario could produce this type of sensor output for the sensors used in this embodiment. This is useful as hard-over faults have a very high potential to reduce driving safety.

In addition to the three input sensors, two system outputs, linear velocity (Vx) and yaw moment (Mz), are considered to gauge whether it is more effective to detect faults using the system outputs or sensor inputs. From qualitative investigation of the outputs, the features appear less prominent in the system outputs due to the number of sensors used and the fixed parameters in the controller. As such, a reduction in accuracy was expected. The approach to detection was the same as with the input sensors, but with only 20 features used (10 for each sensor).

Figure 4:
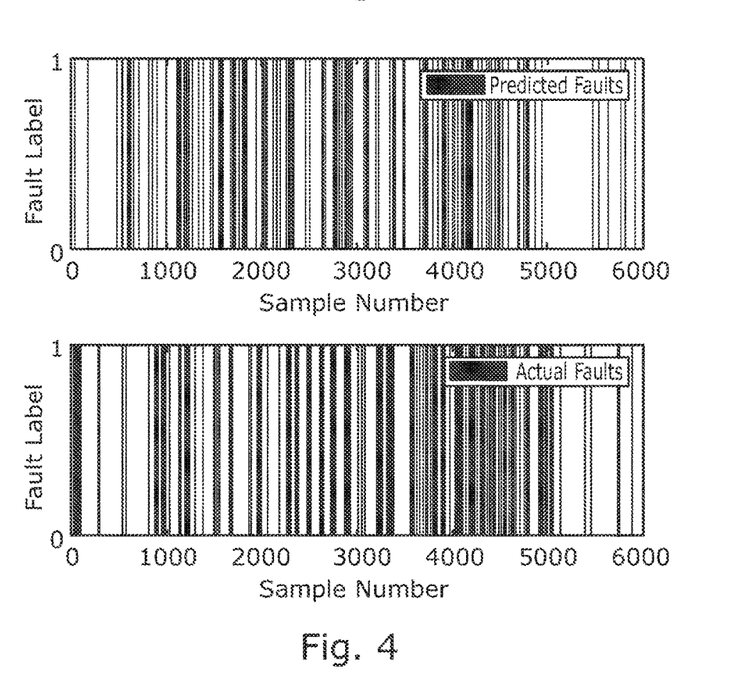
FIG. 4 illustrates fault detection classification results for a 20-feature SVM model of Outputs $V_x$ and $M_z$, alongside the actual faults represented by the sample data.

FIG. 4 shows the performance of the model when trained and tested against the two outputs of the system. Although it represents the faults injected relatively adequately, the overall accuracy is 79.33%, lower than previously with the input sensors. Most significantly, the hard-over accuracy is found to be 75.92%, compared with 100% for the previous model. This illustrates how distinctive features of the faults become subtler and harder to recognise for an SVM model after being propagated through a controller. This is an area where further work is needed to establish whether the losses in detection accuracies by using controller system outputs can be mitigated by feature selection, or whether this is a characteristic of performing fault detection on controller system outputs.

3. Isolation Performance

In the isolation module, the faults are detected for each sensor independently in order to isolate where the fault is occurring. Three 10-feature single class SVM models have been trained, one for each sensor type. An overall detection accuracy of 97.42% is observed, slightly higher than the overall accuracy of the 30-feature SVM model. The accuracies are tabulated in Table 4.

TABLE 4

Isolation detection accuracies for each sensor type, Driving Torque (DT), Braking Pressure (BP). Steering Wheel Angle (SWA) (%)

|  |  | Overall Accuracy | Drift | Hard-over | Erratic | Spike | Stuck |
|---|---|---|---|---|---|---|---|
| Trial | DT | 97.80 | 93.18 | 99.49 | 96.46 | 99.75 | 98.99 |
|  | BP | 97.89 | 95.79 | 99.75 | 96.46 | 99.66 | 97.05 |
|  | SWA | 95.66 | 80.72 | 99.75 | 98.57 | 100.00 | 97.39 |
| Simu- | DT | 97.83 | 93.59 | 99.91 | 96.28 | 99.97 | 99.35 |
| lation | BP | 97.80 | 96.98 | 99.98 | 98.26 | 98.57 | 95.20 |
|  | SWA | 96.62 | 86.25 | 100.00 | 97.41 | 99.98 | 99.33 |

The most significant finding from this simulation is that each sensor had varying accuracies both overall and for each fault type. This appears to be mitigated by the inclusion of more data but remains an issue. This is mainly due to the fact that the normal data types for the sensors are unique to that type of sensor. For instance, the data for the steering wheel angle sensor typically exhibited lower gradients than that of the driving torque, even after normalisation in the SVM model. This explains the difficulty that the SVM model had in detecting a fault in the steering wheel angle sensor for drift faults, as a drift fault has very similar time-domain features to that of a normal signal for that particular sensor.

4. Identification Performance

Figure 5:
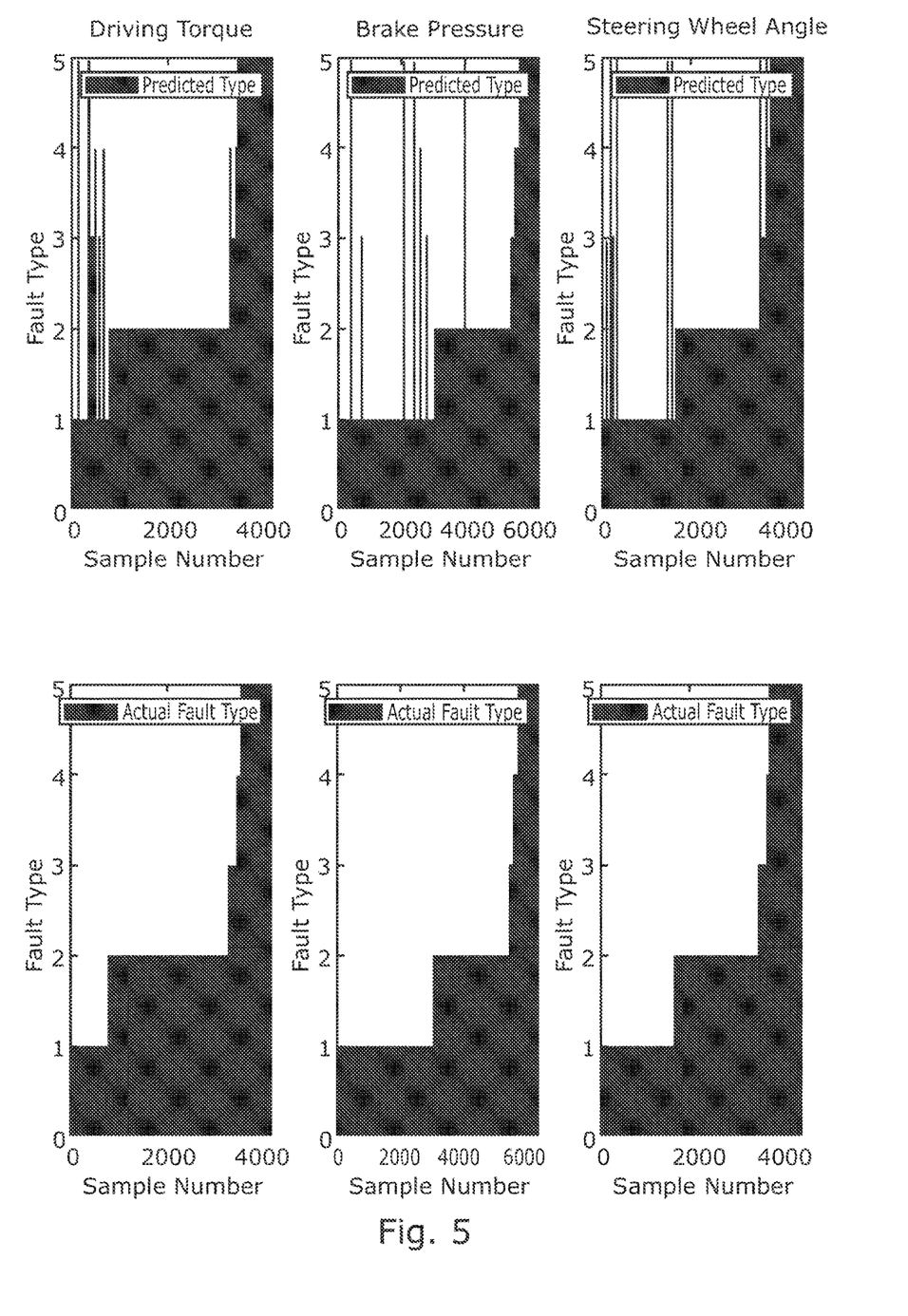
FIG. 5 shows fault-type identification results for three different sensors.

For identification, the sensor which has been isolated from the previous step is tested to determine which type of fault is present. The dataset has been used to train a 10-feature, 5-class SVM model, with each class representing one of the fault types previously modelled. As found with isolation, identification accuracy varies depending on which sensor is tested. This is shown from the results in FIG. 5, with an overall accuracy of 97.01% observed. The breakdown accuracies are tabulated in Table 5.

The identification accuracies vary between 99.10% and 73.49%, with brake pressure having the highest accuracies. Driving torque is poorer with several of the lowest accuracies, especially for spike fault identification. Spike faults are the hardest faults to identify for all sensors, often being misclassified as erratic faults and vice versa. Increasing the amount of training data improved the accuracy for these two fault classes. The reason can be that the spike and erratic faults modelled are too similar to be distinguished easily with the chosen feature set, and more data is needed to accurately predict these two faults. Therefore, future work may be in identifying either a dataset or a feature set which provides a better compromise between the identification accuracy for all fault types.

TABLE 5

Identification Accuracy (%)

|  |  | Overall Accuracy | DT | BP | SWA |
|---|---|---|---|---|---|
| Trial | Drift | 93.52 | 81.58 | 96.10 | 95.59 |
|  | Hard-over | 85.47 | 91.77 | 100.00 | 77.73 |
|  | Erratic | 54.41 | 44.44 | 66.67 | 55.00 |
|  | Spike | 90.91 | 75.00 | 100.00 | 190.00 |
|  | Stuck | 93.82 | 81.58 | 96.10 | 95.59 |
| Simulation | Drift | 97.23 | 93.97 | 98.59 | 96.15 |
|  | Hard-over | 98.65 | 99 10 | 98.99 | 97.63 |
|  | Erratic | 82.17 | 75.65 | 89.61 | 82.84 |
|  | Spike | 79.09 | 73.49 | 81.01 | 34.48 |
|  | Stuck | 97.23 | 93.97 | 98.59 | 96.15 |

Remark 1: The models for the detection, isolation and identification were tuned in order to reduce mis-classification error. The two main parameters of the models which have been tuned are the box constraint and kernel scale parameters. Tuning was performed on a smaller trial dataset (300,000 data points) and then applied to the larger simulation dataset as the process is very time-consuming.

To minimise the CV loss of the model, Bayesian Optimisation was performed with 30 function evaluations using the 'OptimizeHyperparameters' function within MATLAB. The default 10-fold was used with the CV method for tuning. The trial datasets were run using the default box constraint and kernel scale values to validate the improvement in CV loss.

TABLE 6

Tuning Parameters-Trial Detection SVM

|  | C V Loss | C | σ | Training Time |
|---|---|---|---|---|
| Trial | 5.01% | 1 | 1 | 8.8 [s] |
|  | 4.83% | 171.39 | 2.0301 | 76.1 [s] |

Table 6 shows the results of the optimisation function for the 30-feature detection model. As can be seen, a reduction in the CV loss was observed. It is worth noting here that a compromise may be achieved between training time and CV-loss, however the models have been optimised for accuracy. To illustrate the impact of training time, for the trial data the training time increased by a factor of 10 for the indicated 0.18% reduction in CV-loss.

Remark 2: The performance of the SVM models was found to be satisfactory during the testing component of the simulations. As the simulations were able to run faster than the time period of the dataset tested, the architecture can be run in real-time.

However, the training component involved large variability depending on the parameters set. Training times of up to 30 minutes were observed on this relatively small dataset. The workstation used for these simulations has a 3.7 GHz Hex-core CPU and 16 GB of Memory. Memory was not found to be a limiting factor; however the training regularly used 100% of a single CPU core. Parallel processing may improve training time.

5. Fault Prediction

To analyse the accuracy of prediction, the prediction algorithm has been tested for 10,000 degrading erratic faults.

Erratic faults were selected as they were perceived as the most difficult fault type to predict. The overall prediction accuracy is found to be 75.35%. The prediction accuracy here is expressed as the difference between the predicted fault time and the actual fault time for a 20% error, expressed as a percentage of the time in which the fault initiates and degrades to an actual fault.

For this example, a maximum of 100 predictions are attempted to ensure that the fault is always predicted even if it is not accurately predicted in the first trials. Multiple trials are only attempted if the gradient of prediction is found to be too shallow for a prediction to be made. This has been done to only detect faults which are predicted to be degrading fast enough to be of interest.

Table 7 shows an extract of the testing data for an erratic data sample. As can be seen, the distance between the new sample and the hyperplane reduces as the fault error increases, however not linearly. An average normalised score of 0.7 and above was found to exclusively represent healthy samples, therefore this was set as the threshold below which a degrading fault is predicted to be occurring.

TABLE 7

Sample of hyperplane distances of an erratic sample for approximate error values

| Approx. Sample Error | Distance to Hyperplane | Normalised Health Score |
|---|---|---|
| 0% | 0.99 | 0.71 |
| ~5% | 0.97 | 0.71 |
| ~10% | 0.87 | 0.70 |
| ~15% | 0.64 | 0.65 |
| ~20% | −0.43 | 0.39 |

Improvements to accuracy can be gained by using a larger number of health scores to predict, however this reduces the time between the prediction being made and the fault occurring. The parameter choices made for this embodiment give a good compromise between how close the prediction is to the actual fault time, while retaining as much time before the prediction occurs as possible.

Figure 6:
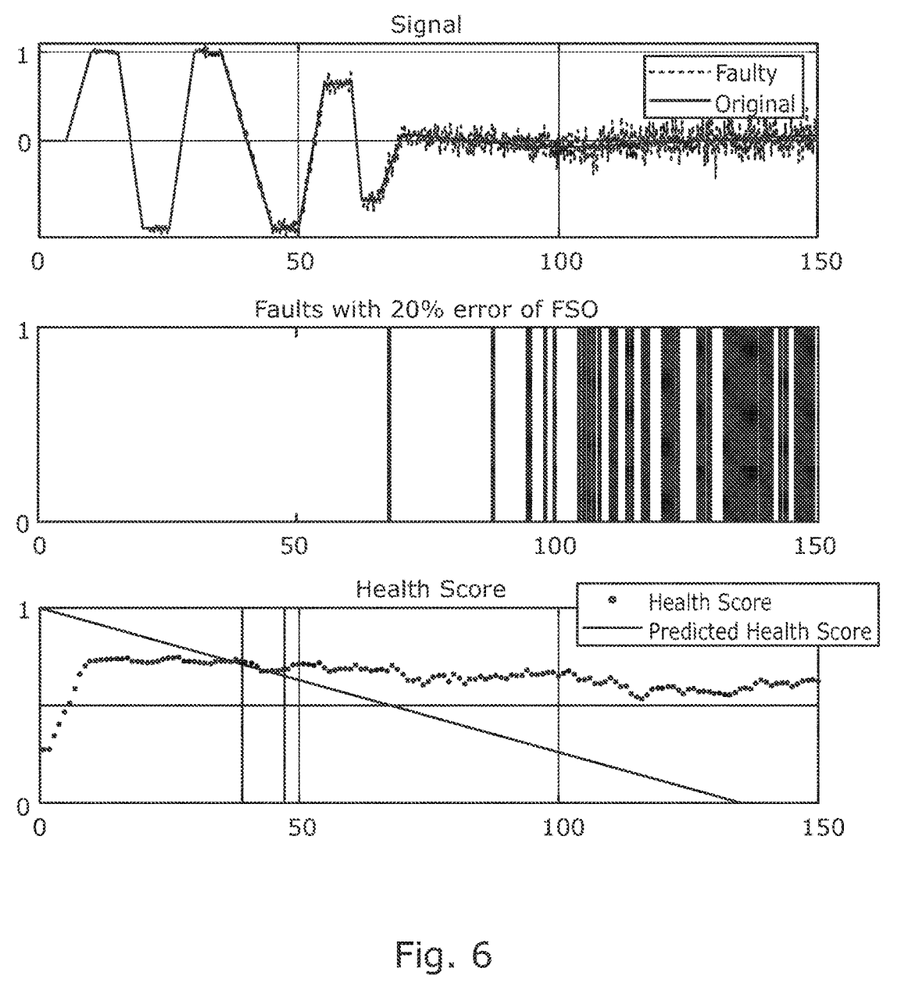
FIG. 6 illustrates an example of linear fault prediction with 98.46% accuracy.
Figure 7:
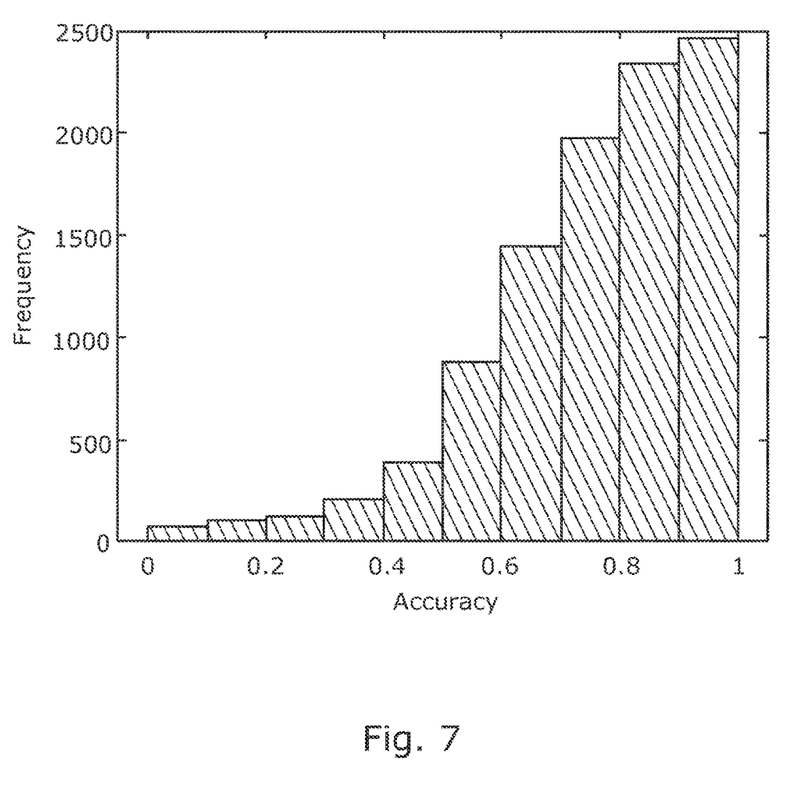
FIG. 7 is a histogram showing frequency distribution of prediction accuracies.

FIG. 6 shows an example of a fault prediction. While this example shows excellent prediction accuracy, the variance was found to be an issue as shown in FIG. 7. Although 24.63% of predictions have accuracies over 90% and give a close approximation to the fault initiation time, 57.44% of predictions had accuracies between 60% and 90%. This was found to be due to a combination of factors, the most significant being the inaccuracies in the detection model for degrading faults. This caused the gradient of the degradation to be too variable to accurately predict. While training the models using degrading faults is explored, it was found that the initiation of degrading faults was classified as normal data and therefore caused the same variable gradient. Additionally, the variability of the erratic fault was a significant problem to try and accommodate, as the signal would often appear to recover as can be seen in FIG. 6. This caused the linear detection to be insufficient to capture the full behaviour of the degradation, demonstrating the challenges that real sensor faults pose to fault prediction.

There were a small number of predictions which failed even after 100 trials, which were included as having 0% accuracy. This is likely unavoidable, although could be improved by tuning the trailing moving-average used. Centre-point moving-averages can also be used for embodiments of the invention and show a small improvement in accuracy, however they have a reduced the time between the prediction being made and the fault initiating, reducing the value of the fault prediction in the first place. Trailing moving-averages are therefore the preferred method of smoothing the health scores for prediction. As can be seen from FIG. 7, only 0.73% predictions completely failed, and 67.68% of predictions showed accuracies in the 70-100% range.

It is also possible to refine a prediction over a longer time period. Moreover, while the time-period for prediction used in this embodiment is short, the same approach can apply to fault types that degrade over much longer time-periods in other embodiments of the invention.

The predictive algorithm was also validated against the two other applicable fault types for degrading faults: drift and spike faults. For spike faults, the definition above was used, where the density of the spike faults increases over time. The parameters tuned with erratic faults were re-used to identify how general this algorithm is. For drift faults, the accuracy reduced to 56.97%. For spike faults, the algorithm was failed to make a prediction for 74.77% of faults, with an overall accuracy of 14.86%.

Further work for this approach would mainly involve identifying coefficients to the logistic function to improve the normalisation, or the exploration of different normalisation functions, allowing for a more linear trend in the health scores. Different approaches to the prediction algorithm should also be explored that may allow for a more generalised algorithm that can predict multiple fault types. The relatively simple trailing moving-average could be replaced with a more sophisticated method, as well as non-linear predictions.

FURTHER EMBODIMENTS

Key observations have been made on the application of SVM models in multi-sensor control systems, most notably showing that different sensors have different detection and identification accuracies when exposed to particular fault types such as drift faults. This observation will be a major consideration for SVM models applied to different multi-sensor control systems subject to a wide variety of faults. The embodiments of the invention described above did not consider the full subset of faults however, but the embodiments can be extended to include a broader definition of faults based on a wider survey of likely sensor system faults. Overall, the accuracies achieved by the FDII system proposed here showed high accuracies of 94.94%, 97.42%, 97.01% for detection, isolation and identification respectively.

For the above embodiments, only a single data-driven method approach was used, but the invention is not limited to this. Generally hybrid approaches can offer significant improvements in detection and identification accuracy given the relative benefits of each method. For example, in a hybrid embodiment, the detection and isolation components can be replaced with an ANN model that will provide significant improvements to accuracy, as the lowest accuracies observed were for the detection module. The isolation module can also be greatly simplified by the ability of the ANN to isolate faults to particular sensors.

Training of the SVM models in the above examples was completed offline with no consideration given to updating this over time. However, online adaptive training can be used in further embodiments to provide improved classification accuracy, especially where parameters are subject to drift over time due to changing conditions. Vehicles operate in an inherently unpredictable environment, so the ability to adapt to changes in the environment can be significantly beneficial.

The above embodiments of the invention provide a novel algorithm for fault prediction in sensing systems of autonomous vehicles. The predictive algorithm uses condition-based data to give the best possible estimate of the time at which a degrading fault will emerge in a sensor. As opposed to time or usage-based approaches used elsewhere, this approach is applicable to all types of fault regardless of their relationship with time or usage-based data. The prediction algorithm shows a relatively simple implementation resulting in a prediction accuracy of 75.35%.

Finally, while not considered in detail here, as IVHM systems typically allow for reconfiguration, the outputs from the FDII system could be used to inform a higher-level vehicle control system which can reconfigure the available healthy components to continue the current vehicle mission. Analytical redundancy for this purpose has already been examined in model-based methods. While the models may not be sufficient to detect faults, they could be used to recover some level of vehicle functionality using available healthy sensors.

Although described with reference to embodiments in the field of automotive sensors, the invention is equally applicable to any mechatronic system, including, but not limited to, robots, rovers, drones, aircraft, and autonomous cars.

It is possible to implement embodiments of apparatus of the invention as one or more hard-wired electronic circuits, some or all of which can be integrated onto a single electronic chip. Furthermore, the invention can be embodied as a combination of hardware and software, and the software can be executed by any suitable general-purpose microprocessor, locally or via a communications network.

The invention can also be embodied as a computer program stored on any suitable computer-readable storage medium, such as a solid-state computer memory, a hard-drive, or a removable disc-shaped medium in which information is stored magnetically, optically or magneto-optically. The computer program comprises computer-executable code that when executed on a computer system causes the computer system to perform a method embodying the invention.

The invention claimed is:

1. A method of sensor fault prediction, comprising:
providing a sensor of a sensor system wherein the sensor is a vehicle mounted sensor;
receiving a time-sequence of output values from the sensor of the sensor system;
extracting a plurality of features from the received values;
applying a model to the features to obtain a health score for the sensor;
calculating a trend of the health score over time to detect degrading performance of the sensor;
predicting a time at which the sensor will become faulty;
indicating a time frame during which the sensor system is to be reconfigured or receive maintenance to remain in a reliable operating range, wherein the time frame is based on the time at which the sensor will become faulty;
performing maintenance on the sensor within the time frame; and
wherein the model comprises a Support Vector Machine, SVM, trained on known sensor state data to define a hyperplane, in a feature space, separating healthy and faulty sensor states.

2. The method according to claim 1, wherein the health score is obtained from a distance from the hyperplane to a point representing a current sensor state.

3. The method according to claim 2, wherein the health score is normalized.

4. The method according to claim 3, wherein the health score is normalized by applying a logistic function.

5. The method according to claim 2, wherein the step of predicting a time at which the sensor will become faulty is performed based on a determination that the current sensor state is less than a threshold distance from the hyperplane.

6. The method according to claim 3, wherein the step of predicting a time at which the sensor will become faulty is performed based on a determination that the health score is less than 0.7, where 0.5 represents the boundary between healthy and faulty sensor states.

7. The method according to claim 1, further comprising taking a trailing average of a plurality of health scores, and using the resulting average in the step of calculating the trend of the health score over time.

8. The method according to claim 1, wherein the SVM is a multi-class SVM, with one class for each of a plurality of different fault types.

9. A computer system comprising:
at least one memory comprising a set of instructions; and
one or more processors operationally engaged to a sensor of a sensor system wherein the sensor is a vehicle mounted sensor, the one or more processors configured to execute the set of instructions to:
receive a time-sequence of output values from the sensor;
extract a plurality of features from the received values;
apply a model to the features to obtain a health score for the sensor;
calculate the trend of the health score over time to detect degrading performance of the sensor,
predict a time at which the sensor will become faulty;
output a signal indicating a time frame during which a sensor system comprising the sensor is to be reconfigured or receive maintenance to remain in a reliable operating range, wherein the time frame is based on the time at which the sensor will become faulty;
performing maintenance on the sensor within the time frame; and
wherein the model comprises a Support Vector Machine, SVM, trained on known sensor state data to define a hyperplane, in a feature space, separating healthy and faulty sensor states.

10. A non-transitory computer readable medium comprising software code portions for performing a method comprising:
providing a sensor of a sensor system wherein the sensor is a vehicle mounted sensor;
receiving a time-sequence of output values from the sensor;
extracting a plurality of features from the received values;
applying a model to the features to obtain a health score for the sensor;
calculating the trend of the health score over time to detect degrading performance of the sensor;
predicting a time at which the sensor will become faulty;
outputting a signal indicating a time frame during which the sensor system comprising the sensor is to be reconfigured or receive maintenance to remain in a reliable operating range, wherein the time frame is based on the time at which the sensor will become faulty, when said software code portions are run on a computer;

performing maintenance on the sensor within the time frame; and wherein the model comprises a Support Vector Machine, SVM, trained on known sensor state data to define a hyperplane, in a feature space, separating healthy and faulty sensor states.

11. An apparatus for predicting a sensor fault, the apparatus being arranged to:

operationally engage a sensor of a sensor system wherein the sensor is a vehicle mounted sensor;

receive a time-sequence of output values from the sensor;

extract a plurality of features from the received values;

apply a model to the features to obtain a health score for the sensor;

calculate a trend of the health score over time to detect degrading performance of the sensor;

predict a time at which the sensor will become faulty;

output a signal indicating a time frame during which the sensor system is to be reconfigured or receive maintenance to remain in a reliable operating range, wherein the time frame is based on the time at which the sensor will become faulty;

performing maintenance on the sensor within the time frame; and wherein the model comprises a Support Vector Machine, SVM, trained on known sensor state data to define a hyperplane, in a feature space, separating healthy and faulty sensor states.

* * * * *